(12) United States Patent  
Taylor et al.

(10) Patent No.: US 8,438,631 B1  
(45) Date of Patent: May 7, 2013

(54) SECURITY ENCLAVE DEVICE TO EXTEND A VIRTUAL SECURE PROCESSING ENVIRONMENT TO A CLIENT DEVICE

(71) Applicants: Zane M. Taylor, Santa Clara, CA (US); Sandeep K. Gupta, Ottawa (CA); Sherman S. Tang, Redondo Beach, CA (US)

(72) Inventors: Zane M. Taylor, Santa Clara, CA (US); Sandeep K. Gupta, Ottawa (CA); Sherman S. Tang, Redondo Beach, CA (US)

(73) Assignee: Sideband Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/749,663

(22) Filed: Jan. 24, 2013

(51) Int. Cl.
*G06F 9/00* (2006.01)
(52) U.S. Cl.
USPC ............................................................ 726/15
(58) Field of Classification Search ...................... 726/15
See application file for complete search history.

(56) References Cited

U.S. PATENT DOCUMENTS

| | | | |
|---|---|---|---|
| 7,093,280 | B2 | 8/2006 | Ke et al. |
| 7,822,982 | B2 | 10/2010 | Raikar |
| 8,032,942 | B2 | 10/2011 | Smith et al. |
| 8,108,668 | B2 | 1/2012 | Rozas |
| 2002/0129285 | A1 | 9/2002 | Kuwata et al. |
| 2008/0183853 | A1 | 7/2008 | Manion et al. |
| 2010/0023755 | A1 | 1/2010 | Kotani et al. |
| 2012/0250686 | A1 | 10/2012 | Klein et al. |

FOREIGN PATENT DOCUMENTS

| EP | 1976219 A1 | 10/2008 |
|---|---|---|
| EP | 2533466 A1 | 12/2012 |

*Primary Examiner* — Jacob Lipman
(74) *Attorney, Agent, or Firm* — Raj Abhyanker, P.C.

(57) ABSTRACT

Disclosed are methods and devices to provide an end-to-end secure transaction over a software defined network (SDN). In one embodiment, a machine-implemented method includes: opening, through an enclave device, an in-band virtual secure channel (VSC) or an out-of-band VSC over the SDN; authenticating, through the enclave device, a user of a resource over the in-band VSC or the out-of-band VSC; facilitating, through the enclave device, an authorization of the user to access the resource over the in-band VSC or the out-of-band VSC; and accounting for a transaction conducted by the user accessing the resource, through the enclave device, over the in-band VSC or the out-of-band VSC.

19 Claims, 7 Drawing Sheets

SECURITY ENCLAVE DEVICE TO EXTEND A VIRTUAL SECURE PROCESSING ENVIRONMENT TO A CLIENT DEVICE

CLAIM OF PRIORITY

This application is a non-provisional application claiming priority to U.S. Provisional Patent Application Ser. No. 61/747,212 titled: "SECURITY ENCLAVE TO EXTEND A VIRTUAL SECURE PROCESSING ENVIRONMENT TO A CLIENT DEVICE," filed on Dec. 29, 2012.

INCORPORATION BY REFERENCE

This application incorporates by reference U.S. patent application Ser. No. 13/726,491 titled: "METADATA-DRIVEN SWITCH NETWORK CONTROL," filed on Dec. 24, 2012, in its entirety.

FIELD OF TECHNOLOGY

This disclosure relates generally to network security technology, in one example embodiment, to methods and apparatus to provide network security to a client device through an enclave device.

BACKGROUND

Demand for a more secure network switching infrastructure has increased with the proliferation of mobile and/or untethered computing devices (such as supervisory control and data access (SCADA) systems, industrial control systems, transportation systems, smartphones, tablet computers, set-top boxes, and hotspot devices). Applications and web browsers running on such devices and over such an infrastructure may be susceptible to attacks by malicious agents at a resource level, or at a resource flow level (such as eavesdropping, key loggers, worms, viruses, Trojan horses, or spoofing attacks). While security experts have developed increasingly complex means of securing traffic flow (such as networking protocols, encryption tunnels, and key generation and authentication systems), the challenge remains to secure a transaction from its origination on a client device to its destination behind a switch, while enabling a non-repudiation of the transaction.

Solutions and software systems implementing a public key infrastructure (PKI) may rely on a transmission of a private key to secure transactions in a network. These software systems may require physical access to a certificate authority to store public keys and issue digital certificates. However this physical access may not be suitable for mobile devices on a wide area network (WAN). More problematic are network security switches and routers that adopt a blacklist approach to prevent malicious agents from connecting to a network and compromising the security of the network. Such a blacklist may implement a draconian set of rules or regular expressions to locate and filter out malicious traffic. To circumvent this, a malicious agent installed on an infected client device may simply change a single bit to evade the most sophisticated traffic management and malware detection mechanism.

Some systems may implement a trusted platform module (TPM) to facilitate the use of keys and the establishment of secure channels. However, these secure communications between devices may often be manipulated by malicious agents to gain access or to set up tunnels to a backend enterprise. Furthermore, security protocols utilized by these systems, such as transport layer security (TLS), secure sockets layer (SSL), or internet protocol security (IPsec), may not scale in network address translation (NAT) networks where proxies and reverse proxies may need to be set up to carry traffic on a mobile network. Furthermore, security protocols utilized by these systems may not be able to validate a user on a specific client device because the client device may not have been issued an identity from a PKI due to complexities in enrollment and maintenance of the identity. In that case, a malicious agent in possession of a user's log on credentials may use the credentials to access any resource from any device regardless of other protections afforded by the device and the network. Also, a malicious agent having remote control of a client device may be able to compromise the integrity of the device and the network and perform malicious actions that may also compromise the ability to perform non-repudiation of a transaction in near real time.

SUMMARY

Disclosed are methods and apparatus to provide an end-to-end secure transaction over a software defined network (SDN). In one aspect, a machine-implemented method includes: opening, through an enclave device, an in-band virtual secure channel (VSC) or an out-of-band VSC over the SDN; authenticating, through the enclave device, a user of a resource over the in-band VSC or the out-of-band VSC; facilitating, through the enclave device, an authorization of the user to access the resource over the in-band VSC or the out-of-band VSC; and accounting for a transaction conducted by the user accessing the resource, through the enclave device, over the in-band VSC or the out-of-band VSC.

The in-band VSC may be opened over an in-band network and the out-of-band VSC may be opened over an out-of-band network using a user identity, a client device identity, and/or a resource identity distributed through a PKI. Additionally, the in-band network may be a wireless network established over a licensed radio frequency band or a wired network. Moreover, the out-of-band network may be a wireless network established over an unlicensed radio frequency band.

The method also includes authenticating the user of the resource through a multi-factor authentication mechanism using one or more readers of the enclave device. The multi-factor authentication mechanism may comprise two or more of a near-field communication (NFC) identification mechanism, a biometric reader identification mechanism, a user name and password identification mechanism, a pattern matching identification mechanism, a global positioning system (GPS) identification mechanism, or a radio-frequency identification (RFID) mechanism. In this case, the user identity may be received through the in-band VSC or the out-of-band VSC.

In this aspect, the method also involves facilitating, through the enclave device, the authorization of the user to access the resource by: generating a one-time encrypted software token (EST) through a trusted platform module (TPM), sending a hash of the one-time EST through the in-band VSC or the out-of-band VSC to a switch managing the SDN, and authorizing the user to access the resource based on a comparison of the hash of the one-time EST with a one-time EST independently generated by the switch. In this aspect, the enclave device may comprise a battery, a low-power processor, an NFC chip, a plurality of readers, an interface to a client device used by the user to access the resource, and a storage device coupled to the low-power processor. Also in this aspect, the interface to the client device may be a physical interface that couples the enclave device to the client device through a physical connection. The interface to the client device may also be a radio interface that couples the enclave device to the client device through a radio frequency connection.

In an alternative aspect, the enclave device may be an integrated circuit chip embedded in a client device used by the user to access the resource. In another alternative aspect, the enclave device may be a software module running on a client device used by the user to access the resource.

In another aspect, an enclave device is disclosed to provide an end-to-end secure transaction over a SDN. The enclave device comprises: one or more low-power processors; one or more storage devices communicatively coupled to the one or more low-power processors; a number of readers communicatively coupled to the one or more low-power processors; an NFC chip communicatively coupled to the one or more low-power processors; a battery; an interface to a client device; and one or more programs, where the one or more programs are stored in the one or more storage devices and executable by the one or more low-power processors.

In this aspect, the one or more programs comprises instructions to open an in-band virtual VSC or an out-of-band VSC from the client device to a switch managing the SDN, instructions to authenticate a user of a resource over the in-band VSC or the out-of-band VSC, instructions to facilitate an authorization of the user to access the resource using the client device over the in-band VSC or the out-of-band VSC, and instructions to account for a transaction conducted by the user through the client device using the resource over the in-band VSC or the out-of-band VSC.

In this aspect, the in-band VSC may be opened over an in-band network and the out-of-band VSC may be opened over an out-of-band network. In particular, the in-band network may be a wireless network established over a licensed radio frequency band or a wired network and the out-of-band network may be a wireless network established over an unlicensed radio frequency band. Either the in-band VSC or the out-of-band VSC may be opened at a resource level, a resource flow level, or a network level. Additionally, a virtual network may be established over the in-band VSC or the out-of-band VSC under the direction of the switch managing the SDN.

The one or more programs may further comprise instructions to authenticate the user through a multi-factor authentication mechanism using one or more readers of the enclave device. In this aspect, the multi-factor authentication mechanism comprises two or more of an NFC identification mechanism, a biometric reader identification mechanism, a user name and password identification mechanism, a pattern matching identification mechanism, a GPS identification mechanism, or an RFID mechanism.

The one or more programs may also comprise instructions to facilitate the authorization of the user to access the resource using the client device with further instructions to: generate a one-time EST through a TPM of the enclave device, send a hash of the one-time EST through the in-band VSC or the out-of-band VSC to the switch, and authorize the user to access the resource based on a comparison of the hash of the one-time EST with a one-time EST independently generated by the switch.

The interface to the client device may be a physical interface that couples the enclave device to the client device through a physical connection. Alternatively, the interface to the client device may be a radio interface that couples the enclave device to the client device through a radio frequency connection.

In yet another aspect, disclosed is a storage medium readable through a processor, and including instructions embodied in the storage medium and configured to be executable through the processor, comprising: instructions to open an in-band VSC or an out-of-band VSC from a client device to a switch managing an SDN; instructions to authenticate, through a reader communicatively coupled to the processor, a user of a resource over the in-band VSC or the out-of-band VSC; instructions to facilitate an authorization of the user to access the resource over the in-band VSC or the out-of-band VSC; and instructions to account for a transaction conducted by the user using the resource over the in-band VSC or the out-of-band VSC In this aspect, the in-band VSC may be opened over an in-band network and the out-of-band VSC may be opened over an out-of-band network. In particular, the in-band network may be a wireless network established over a licensed radio frequency band or a wired network and the out-of-band network may be a wireless network established over an unlicensed radio frequency band. Either the in-band VSC or the out-of-band VSC may be opened at a resource level, a resource flow level, or a network level. Additionally, a virtual network may be established over the in-band VSC or the out-of-band VSC under the direction of the switch managing the SDN.

The storage medium may further comprise instructions to authenticate the user through a multi-factor authentication mechanism using one or more readers of the enclave device. In this aspect, the multi-factor authentication mechanism comprises two or more of an NFC identification mechanism, a biometric reader identification mechanism, a user name and password identification mechanism, a pattern matching identification mechanism, a GPS identification mechanism, or an RFID mechanism.

Finally, the storage medium may also comprise instructions to facilitate the authorization of the user to access the resource using the client device with further instructions to: generate a one-time EST through a TPM of the enclave device, send a hash of the one-time EST through the in-band VSC or the out-of-band VSC to the switch, and authorize the user to access the resource based on a comparison of the hash of the one-time EST with a one-time EST independently generated by the switch.

The methods and apparatus disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

Other features of the present embodiments will be apparent from the accompanying drawings and from the detailed description that follows.

DETAILED DESCRIPTION

Disclosed are methods and apparatus to provide an end-to-end secure transaction over a software defined network (SDN). Although the present embodiments have been described with reference to specific example embodiments, it will be evident that various modifications and changes may be made to these embodiments without departing from the broader spirit and scope of the various embodiments. It should be understood by one of ordinary skill in the art that the terms "application(s)," "program(s)," "software," "software code," "sub-program(s)," "module(s)," and "block(s)" are industry terms that refer to computing instructions stored in a memory or storage device of a processing device and executable by a processor of the processing device.

Figure 1:
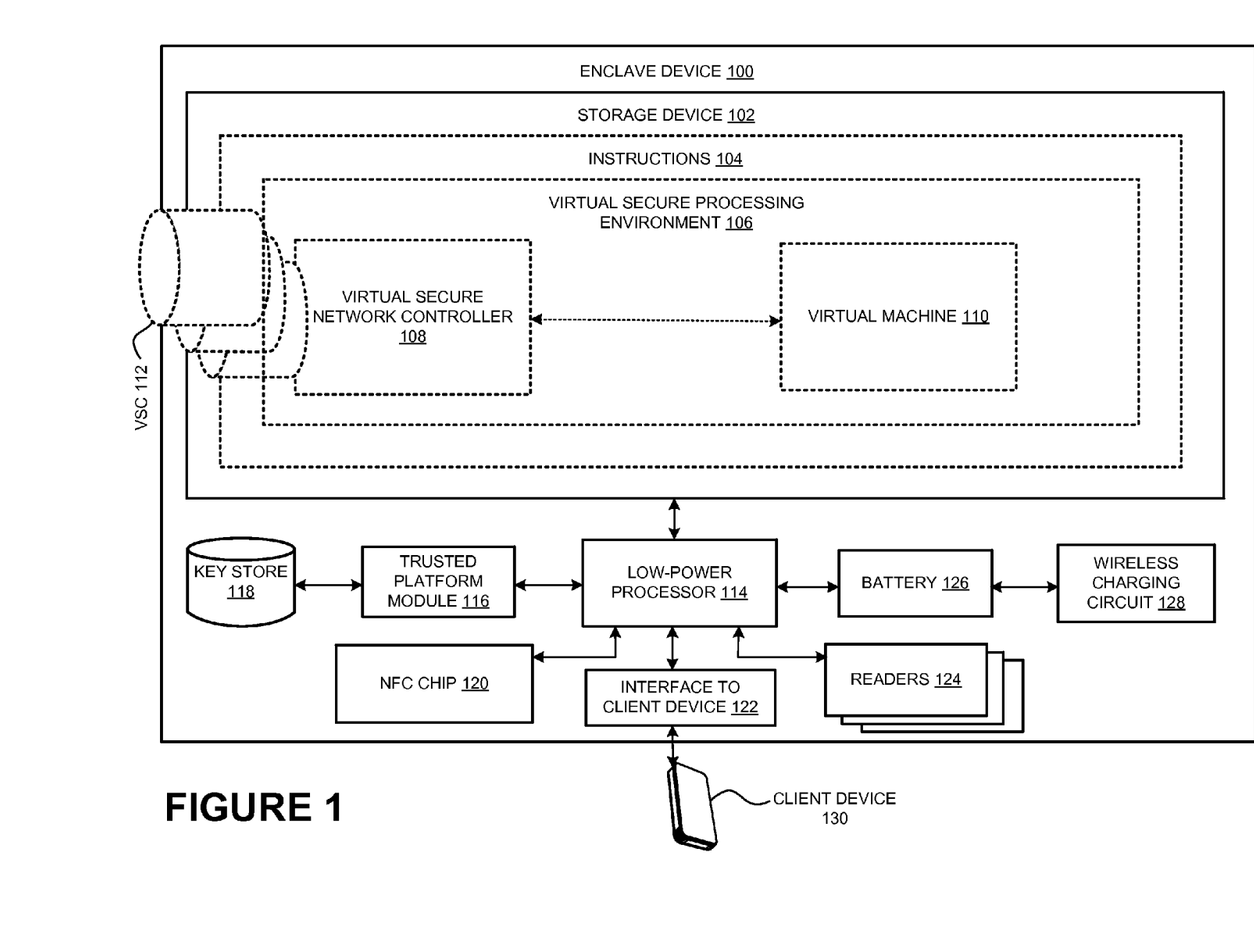
FIG. 1 illustrates an enclave device to provide an end-to-end secure transaction over a SDN, according to one or more embodiments.
Figure 3:
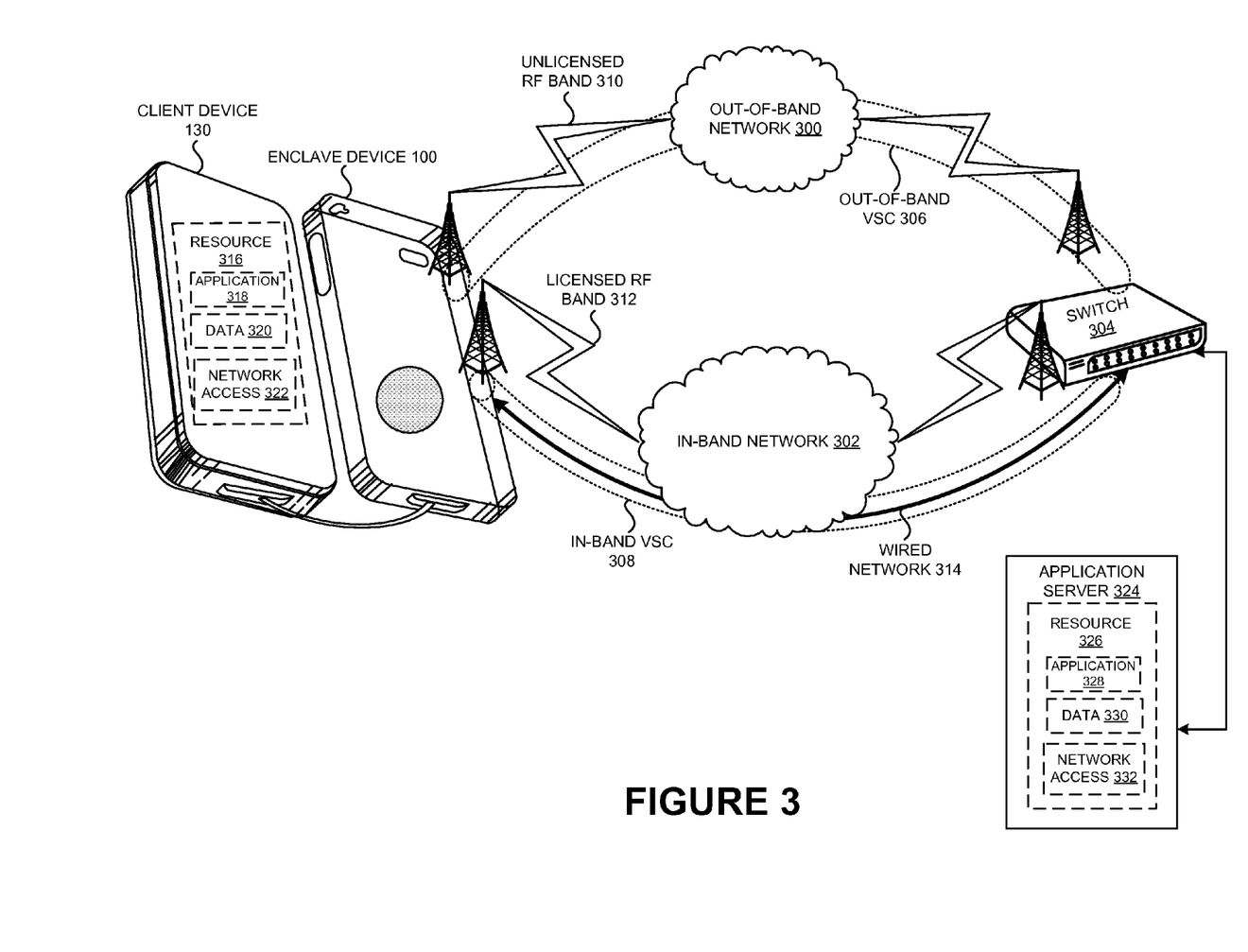
FIG. 3 illustrates VSCs being opened over an out-of-band network and an in-band network using the enclave device of FIG. 1, according to one or more embodiments.

Reference is now made to FIG. 1, which illustrates a block diagram of an enclave device 100 used to extend a virtual secure processing environment (VSPE) 106 to a client device 130 and to provide virtual networking and security functions to a user of the client device 130 accessing a resource. The enclave device 100 also allows the client device 130 to conduct an end-to-end secure transaction over an SDN. In one or more embodiments, the enclave device 100 comprises a storage device 102, a low-power processor 114, a trusted platform module 116, a key store 118, an NFC chip 120, an interface to a client device 122, readers 124, a battery 126, and a wireless charging circuit 128. All such components of the enclave device 100 are coupled to the low-power processor 114 through high-speed buses indicated by double-arrowed lines. The low-power processor 114 may be a low-voltage microprocessor having two to four cores. The trust platform module 116 may be implemented as a secure cryptoprocessor designed according to the specifications of the Trusted Computing Group (see www.trustedcomputinggroup.org). As depicted in FIG. 1, the trusted platform module 116 may be coupled to a hardware-based key store 118 to store keys distributed through a public key infrastructure (PKI).

The storage device 102 may comprise of programs or instructions 104 to maintain a virtual secure processing environment 106. The VSPE 106 may comprise a virtual secure network controller 108 and a virtual machine 110. The virtual secure network controller 108 may open an in-band VSC or an out-of-band VSC (depicted here as VSC 112) over the SDN to a switch managing the SDN (for example, the switch 304 in FIG. 3). The virtual machine 110 may further segregate the in-band VSC or the out-of-band VSC opened into one or more virtual networks or VLANs. It should be understood by one of ordinary skill in the art that the instructions 104 of the storage device 102 may be executed by the low-power processor 114 or another low-power processor embedded in the enclave device 100 and not shown in FIG. 1. Additionally, the lower-power processor 114 may execute instructions stored in a memory of the trust platform module 116 and may also execute instructions stored in a memory of one or more of the readers 124. The VSPE 106 may automatically enroll, maintain, and manage a user identity a device identity, and a resource identity and their associated public and private keys distributed through a PKI and store such keys in the key store 118 of the trusted platform module 116. The VSPE 106 may also allow a user, a client device, and/or a resource to interact with data storage mechanisms, as well as VSC networking capabilities. This may be provided through an API interface that may be integrated into an application layer program on the client device. The VSPE 106 may also provide an API for an application layer program on the client device to integrate with the readers 124, without gaining access to the data gathered by the readers 124. This prevents malware on the client device from providing data to a threat agent. The VSPE 106 may also provide a way for the operating system of the client device to monitor the keyboard of the client device and ensure that a key logger is not running on the device by monitoring the VSC. The VSPE 106 may also permit profiling, integrity checking, and performance analysis of the client device as well as sending any metrics to the switch managing the SDN. The VSPE 106 may send certain historical and near real-time information regarding a user, a client device, a resource, an in-band VSC, an out-of-band VSC to the switch managing the SDN. Such information may also include a flow information, which may comprise data packets from a user, a device, an application, a tenant, and/or a VLAN identifier. Additionally, the VSPE 106 may account for a 5 tuple (src IP, dst IP, src Port, dst Port, and/or protocol identifiers) information regarding network address translation (NAT) addresses, a flow state, a sequence number, a bandwidth low watermark, a bandwidth high watermark, a bandwidth current, a flow uptime, an L4 application protocol, and/or an L7 application protocol. Additionally, the VSPE 106 may account for information regarding a VSC such as the user identity, the device identity, the resource identity used to open the VSC, and the type of VSC opened (whether in-band or out-of-band). Furthermore, the VSPE 106 may account for the processes, applications, and data accessed by a client device and the configuration of the client device, including a manufacturer information, an operating system and applications installed on the client device, a serial number of the client device, the type of memory on the client device, and the version of the client device. By tracking this level of data, it enables a near real time security incident handling process where a network administrator can manage and monitor all traffic per user, per device, and/or per resource.

The readers 124 may comprise of a biometric reader, a pattern recognition reader such as a quick-response (QR) code reader, a bar code reader, or a gesture reader, or a username and password reader. Such readers may be embedded hardware components in the enclave device 100.

Moreover, the low-power processor 114 may be coupled to the NFC chip 120, which may be used by a user to provision the switch managing the SDN (for example, switch 304 of FIG. 3) or to perform other transactions over a network requiring a non-repudiation of a transaction conducted by the user. This may be in the form of an e-commerce transaction, a financial transaction, and/or a file/data sharing between the user of the client device and a resource controlled by a switching managing the SDN. The NFC chip 120 may be any NFC tag operating on an ISM radio band approved by the NFC Forum and satisfying the requirements of ISO/IEC 18000-3, ISO/IEC 14443, or JIS X 6319-4. Additionally, the wireless charging circuit 128 may be implemented as a wireless inductive charger used to charge the battery 126.

Finally, the low-power processor 114 may be coupled to the interface to the client device 122. The interface to the client device 122 allows the enclave device 100 to communicate with the client device 130 and to access one or more resources stored in the client device 130. This may be a universal serial bus (USB), an Apple® 30 pin interface, or an Apple® Lightning® interface.

Figure 2A:
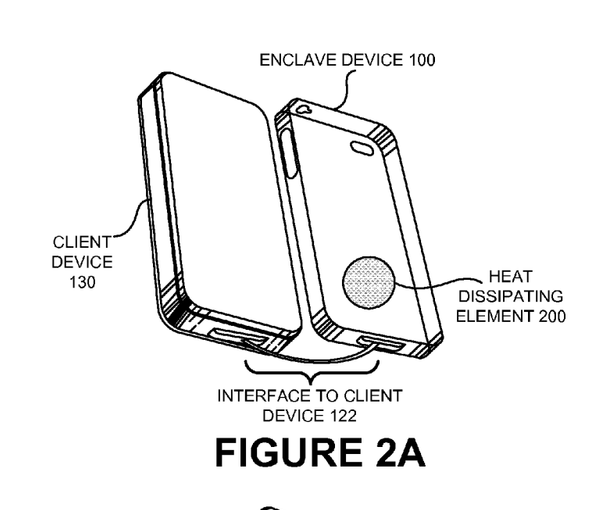
FIGS. 2A-2D illustrate various embodiments of the enclave device FIG. 1, according to one or more embodiments.

Reference is now made to FIGS. 2A-2D, which illustrate various embodiments of the enclave device 100 FIG. 1, according to one or more embodiments. In one embodiment, the enclave device 100 may be physical encasement of the client device 130. As depicted in FIG. 2A, the enclave device 100 may be a smartphone or mobile phone wrapper or a smartphone or mobile phone case when the client device 130 is a smartphone or mobile phone. In this embodiment, the enclave device 100 may comprise a heat dissipating element 200. This may be implemented as a heat sink, a covered grille, or a mesh window that enables airflow, but that does not allow physical access to the enclave device 100's printed circuit board. This may be required when the enclave device 100 is a protective case to enable the client device 130 to dissipate heat, and prevent the client device 130 from overheating. As shown in FIG. 2A, the interface to the client device 122 may be a physical interface such as a connecting wire or dock connector comprising a power bus and a data bus. This may be a universal serial bus (USB), an Apple® 30 pin interface, or an Apple® Lightning® interface.

Figure 2B:
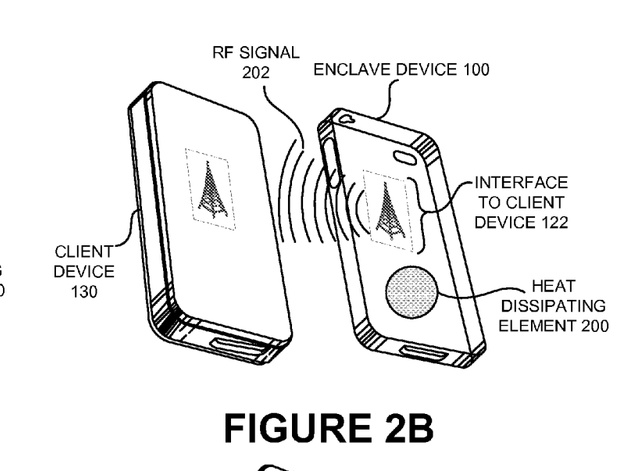

In another embodiment, the enclave device 100 may be a smartphone or mobile phone wrapper, a smartphone or mobile phone case, or a wrapper at short range (less than 1 meter) to the client device 130. In this embodiment, the enclave device 100 may communicate with the client device 130 through a radio interface. As depicted in FIG. 2B, both the enclave device 100 and the client device 130 may comprise an antenna to receive and transmit RF signals 202 over an unlicensed RF band at short range. In one embodiment, the interface to the client device 122 may be this antenna.

Figure 2C:
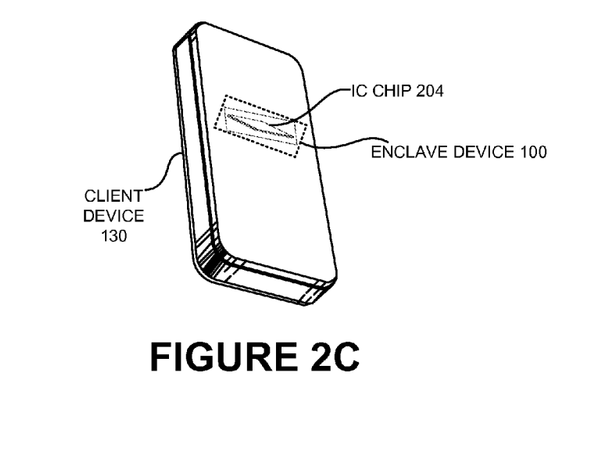

In yet another embodiment, the enclave device 100 may be an integrated circuit (IC) chip 204 embedded in the client device 130. In this embodiment, the storage device 102, the lower-power processor 114, the trusted platform module 116, the key store 118, and the interface to the client device 122 (see FIG. 1) would be integrated on this IC chip 204. The battery 126, the wireless charging circuit 128, the NFC chip 120, and the readers 124 may be components coupled to the client device 130 or may be components already embedded in the client device 130. The battery 126 may also serve to charge the battery of the client device 130.

Figure 2D:
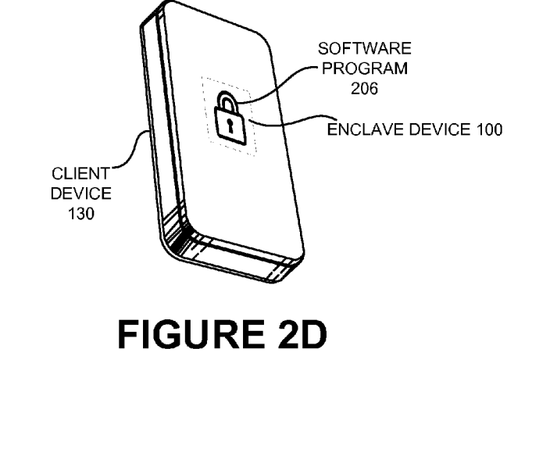

Finally, in yet another embodiment, the enclave device 100 may be a software program 206 or software module running on the client device 130. In this embodiment, only the instructions 104 for the virtual secure processing environment 106 would be stored in a storage device or memory of the client device 130. As such, the low-power processor 114, the trust platform module 116, the key store 118, the NFC chip 120, the interface to the client device 122, the readers 124, the battery 126, and the wireless charging circuit 128 (see FIG. 1) may be components coupled to the client device 130 or may be components already embedded in the client device 130.

Reference is now made to FIG. 3, which illustrates VSCs being opened over an out-of-band network 300 and an in-band network 302 using the enclave device 100 of FIG. 1, according to one or more embodiments. As depicted in FIG. 3, the enclave device 100 may open an in-band VSC 308 over the in-band network 302. The in-band network 302 may be a wireless network established over a licensed RF band 312 or a wired network 314. In both cases, the in-band VSC 308 is established over an SDN managed by a switch 304. The in-band VSC 308 may be opened from the enclave device 100 to the switch 304 and may be opened at a resource level, a resource flow level, or a network level. In one embodiment, the switch 304 may be the metadata-driven switch of U.S. patent application Ser. No. 13/726,491. At a resource level, all traffic for a specific resource or application may be encapsulated in a single VSC irrespective of the number of unique flows generated for that resource. At a resource flow level, all traffic from a specific user, device, or resource may be encapsulated in multiple VSCs according to the unique flow of traffic. At a network level, traffic may be encapsulated according to specific source and destination network addresses without regard to the resource or the flows.

In the exemplary embodiment shown in FIG. 3, the switch 304 is connected to an application server 304 comprising a resource 326. This resource 326 may further comprise an application 328, a piece of data 330, or network access 332 to the SDN or another network. In one embodiment, a resource residing on the client device 130 (such as resource 316) coupled to the enclave device 100 may be a presentation layer of an application residing on the application 324. For example, the application 318 may be a presentation layer of the application 328 residing on the application server 324 behind the switch 304. In another embodiment, the resource 316 may reside exclusively on the client device 130 and the enclave device 100 may prevent an unauthorized user from obtaining access to the resource 316 by requiring the user pass an authentication step involving one or more of the readers 124 of the enclave device.

Also shown in FIG. 3 is an out-of-band VSC 306 opened over an out-of-band network 300. In one embodiment, the out-of-band network is a wireless network established over an unlicensed RF band 310 (e.g., an ISM radio band). Similar to the in-band VSC 308, the out-of-band VSC 310 may also be opened from the enclave device 100 to the switch 304 and may be opened at a resource level, a resource flow level, or a network level. In one or more embodiments, the out-of-and VSC 306 may be used primarily to transmit EST from the enclave device 100 to the switch 304 and back.

Figure 4:
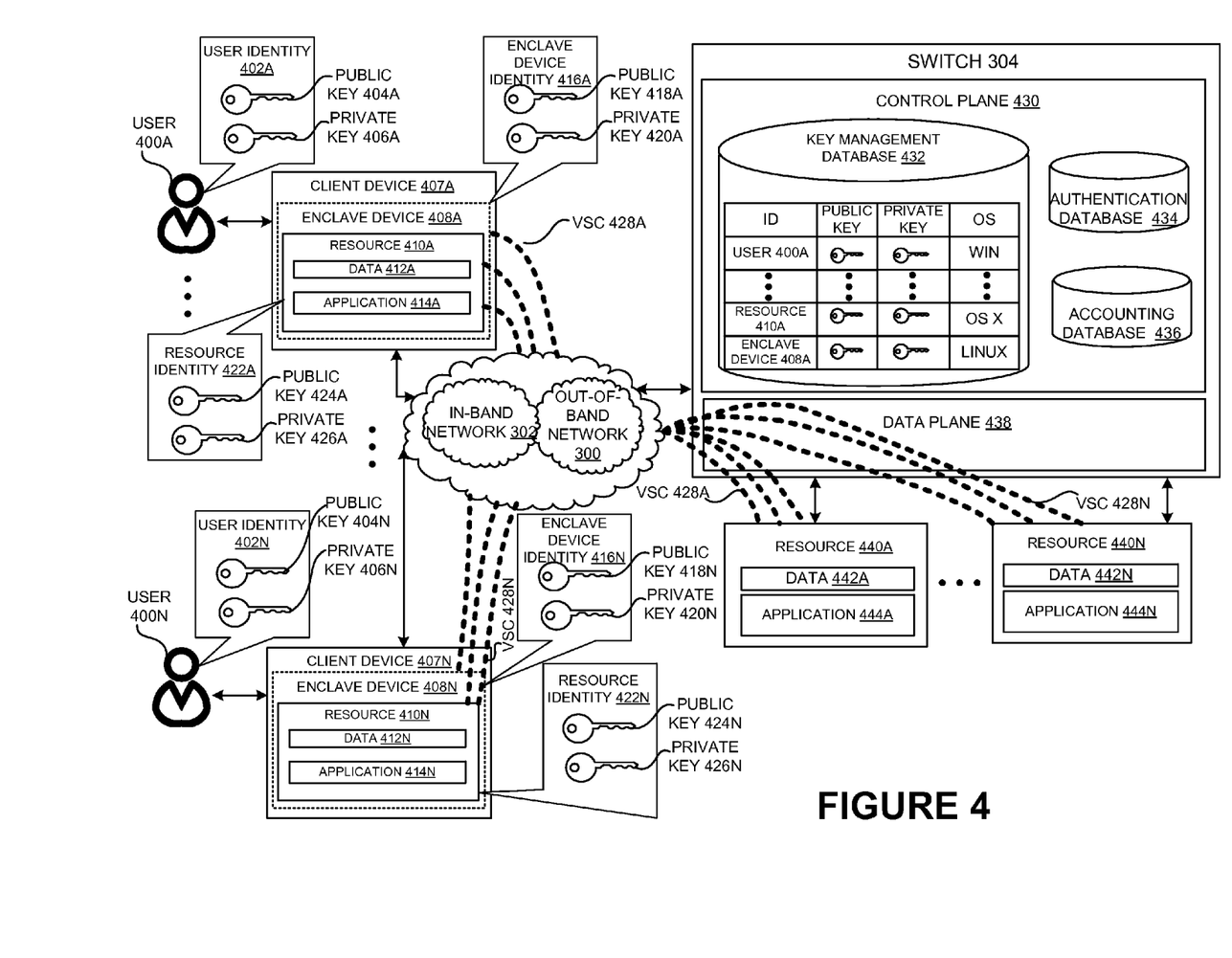
FIG. 4 illustrates an enclave device accessing one or more resources over the VSCs, according to one or more embodiments

Reference is now made to FIG. 4, which illustrates an enclave device accessing one or more resources over the VSCs, according to one or more embodiments. The enclave devices depicted in FIG. 4 (for example, enclave device 408A to 408N) may each be the enclave device 100 of FIG. 1 and multiple enclave devices (for example, enclave device 408A to 408N) may connect to the switch 304 simultaneously.

It should be understood by one of ordinary skill in the art of network security that a SDN refers to a network architecture where network traffic is controlled using software without requiring the network administrator to have access to the network's hardware devices. A switch used to manage the SDN (such as switch 304) may decouple the control of the network, through a control plane (such as control plane 430) of the switch, from the switching or forwarding of network traffic, through a data plane (such as data plane 438) of the switch. In one or more embodiments, the switch 304 may be the metadata-driven switch of U.S. patent application Ser. No. 13/726,491.

In one embodiment, the enclave devices 408A to 408N may open one or more in-band VSCs or out-of-band VSCs (for example, VSC 428A to VSC 428N) to the switch 304 over the SDN IP using an Internet Key Exchange (IKE or IKEv2) protocol and an Internet Protocol Security (IPsec) complying to RFC 6071. Once a VSC is established, all data packets transmitted through the VSC is encrypted and decrypted using mutual digital signatures. In one embodiment, the in-band and out-of-band VSC (for example, VSC 428A to VSC 428N) may operate on an internet layer of TCP/IP. In another embodiment, the enclave devices 408A to 408N may open one or more in-band VSCs or out-of-band VSCs (for example, VSC 428A to VSC 428N) over the SDN using a transport layer security (TLS) protocol operating on an upper layer of TCP/IP complying to RFC 6176.

As depicted in FIG. 4, the switch 304 comprises a control plane 430 and a data plane 438. The control plane 430 further comprises a key management database 432, an authentication database 434, and an accounting database 436. While the VSCs and the network traffic carried by the VSCs are forwarded through the data plane 438 of the switch, the control plane 430 stores information transmitted through the VSCs and controls how network traffic is forwarded through the data plane 438.

In FIG. 4, VSC 428A to VSC 428N may refer to any number of VSCs established over the in-band network 302 or the out-of-band network 300. In one or more embodiments, an in-band VSC or an out-of-band VSC may be opened at a resource level, a resource flow level, or a network level using a user identity, a client device identity, or a resource identity distributed through a public key infrastructure (PKI).

In the exemplary embodiment shown in FIG. 4, user 400A may be assigned a user identity 402A by a network administrator. The user identity 402A may comprise a public key 404A and a private key 406A. The user identity 402A may comprise of information known only to the user 400A, such as a username or password, and may be used by a PKI to create the public key 404A and the private key 406A. While a public key 404A can be sent through the one or more VSCs, the user 400A's private key 406A cannot be shared with anyone other than the user 400A.

In FIG. 4, the user 400A may use the enclave device 408A to open a VSC (for example, VSC 428A) to a resource 410A on the client device 407A. In this embodiment, the client device 407A may be the client device 130 shown in FIGS. 1 and 2. This VSC (for example VSC 428A) may connect to a resource 440A behind the switch 304, which may be a server side resource required by the user 400A to run the resource 410A. In this embodiment, the enclave device 408A is either the enclave device 100 shown in FIG. 2C or the enclave device 100 shown in FIG. 2D. Also in this embodiment, the resource 410A may be a presentation layer application (for example, application 414A) of an application residing on an application server behind the switch 304 (for example, application 444A). Not shown in FIG. 4 is an alternative embodiment where the enclave device 408A is communicatively coupled to a client device (such as the client device 130) and the resource 410A is a resource resident on the client device. In this embodiment, the client device may be the client device 130 of FIGS. 2A and 2B and the enclave device may be the enclave device 100 of FIGS. 2A and 2B. In both embodiments, the user 400A must open the VSC through the virtual secure network controller 108 (see FIG. 1) of the enclave device. The same limitations apply to all other enclave devices shown in FIG. 4.

In all embodiments, the enclave device 408A may be assigned an enclave device identity 416A comprising a public key 418A and a private key 420A. The user identity 402A, and the enclave device identity 416A may be stored in a trusted platform module of the enclave device 408A, which is understood by one with ordinary skill in the art to mean a cryptographic off load processor designed to store cryptographic keys on a network-enabled device. The enclave device identity 416A may comprise of information related to a manufacturer of the enclave device 408A, a serial number of the enclave device 408A, or a memory type installed on the enclave device 408A used by a PKI to create the public key 418A and private key 420A.

In one or more embodiments, the client devices indicated in FIG. 4 (client devices 407A to 407N) may refer to a network enabled processing device (e.g., SCADA, ICS, smartphone, mobile phone, tablet computer, laptop, computer, etc.). In another embodiment, the client devices indicated in FIG. 4 (client devices 407A to 407N) may refer to a network enabled apparatus (e.g., a network enabled security camera, network enabled walkie-talkie, network enabled thermostat, etc.).

Moreover, the resource 410A may also be assigned a resource identity 422A comprising a public key 424A and a private key 426A. In this embodiment, a resource (such as resource 410A) may refer to a set of data, an application, or access to a network such as a wide area network (WAN) (e.g., the Internet) or an enterprise network or intranet. As indicated above, while resource 410A may be stored in a memory of the client device 407A, the resource 410A may also be an application layer or presentation layer of a resource residing on an application server behind the switch 304. For example, resource 440A may be the resource ultimately accessed by the user 400A when the user 400A inputs commands into the presentation layer of the resource (such as resource 410A).

As depicted in FIG. 4, VSC 428A may be an in-band VSC opened at a network level from the enclave device 408A through the in-band network 302 and ending at the resource 440A. In this embodiment, the VSC 428A may carry network traffic for various applications on the client device 407A (e.g., email traffic, web browsing traffic, VOIP traffic, etc.). In another embodiment, the VSC 428N may be an out-of-band VSC opened at a resource level from resource 410N on the client device 407N through the out-of-band network 300 to resource 440N. The VSC 428N may carry network traffic exclusively for the resource 410N (e.g., enterprise application traffic). Data traffic through all such VSCs, including VSC 428A and VSC 428N, may be forwarded or directed through the data plane 438 of the switch 304. In another embodiment, the VSC may carry traffic at a resource flow level when the resource requires communication with multiple destinations, such as a web browser.

In one embodiment, the VSCs 428A to 428N may be opened for a pre-determined period of time. In another embodiment, the VSCs 428A to 428N may be opened for as long as a resource is being used by the user 400A. In a further embodiment, the VSCs 428A to 428N may close as soon as a malicious agent is detected on the SDN, or as soon as a transaction is completed to mitigate risk from a malicious agent.

Also depicted in FIG. 2 is the switch 304's control plane 430. The control plane 430 comprises the key management database 432, the authentication database 434, and the accounting database 436. In one embodiment, the key management database 432 may include a lightweight directory access protocol (LDAP) database storing information related to a user identity, an enclave device identity, or a resource identity. The key management database 432 may share information with the authentication database 434 and the accounting database 436.

In addition to the aforementioned users, client devices, and resources, it should be understood by one of ordinary skill in the art of network security that the switch 304 may accommodate any number of users (ranging from user 400A to user 400N), client devices (ranging from client device 407A to client device 407N), enclave devices (ranging from enclave device 408A to enclave device 408N), and resources (ranging from resource 410A to resource 410N) up to the switching capacity of the data plane 438 of the switch 304. It should also be understood by one of ordinary skill in the art that the switch 304 may be connected to other switches on the SDN to form a switch system that may extend the switch capability of the data plane 438.

Figure 5:
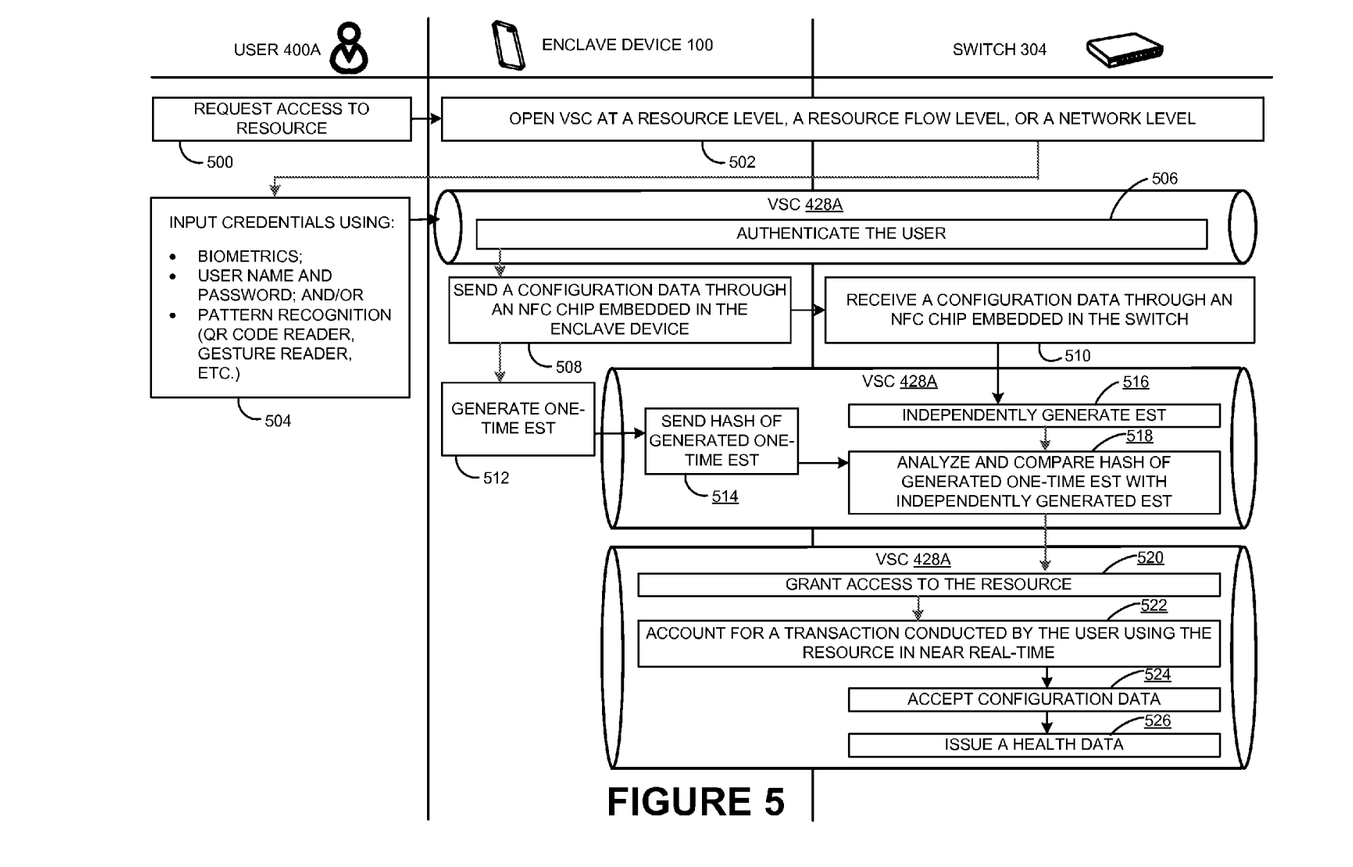
FIG. 5 illustrates a columnar process flow diagram of a user gaining access to a resource through the enclave device of FIG. 1, according to one or more embodiments.

Reference is now made to FIG. 5, which illustrates a columnar process flow diagram of the user 400A gaining access to a resource through the enclave device 100 of FIG. 1, according to one or more embodiments. As depicted in FIG. 5, operation 500 involves the user 500A requesting access to the resource. This may involve the user 400A tapping on a display screen of a client device used by the user 400A (such as client device 130). The display screen may display a user interface of an application (such as the application 414A) resident on the client device 130 or 407A. In one embodiment, the application may be the presentation layer of an application resident on an application server communicatively coupled to the switch 304.

In response to the request of the user 400A, operation 502 involves the enclave device 100 opening an in-band VSC or an out-of-band VSC to the switch 304 over the SDN. The VSC may be opened at a resource level, a resource flow level, and/or a network level for the sole purpose of authenticating and authorizing the user as required by the resource. As indicated in FIG. 4, opening a VSC at a resource level (such as for one specific software application) may involve transmitting all data packets relating to the resource from the client device 130 or 407A, through the enclave device 100, to the switch 304 or an application server coupled to the switch 304 (and vice versa). Once the in-band or out-of-band VSC has been opened, operation 504 may involve the switch 304 prompting the user 400A to input a set of credentials into the enclave device 100. The set of credentials may include a biometric data received from the user 400A (wherein the biometric data may be obtained from a biometric reader coupled to the enclave device 100 or the client device 130), a user name and password, and/or a pattern recognition data received from the user 400A (wherein the pattern recognition data may be obtained from a pattern recognition reader—such as a QR code reader, a gesture reader, or a bar code reader—coupled to the enclave device 100 or the client device 130. Such credentials may be a part of a multi-factor authentication mechanism where the user 400A may be authenticated through any two of an NFC identification mechanism, a biometric reader identification mechanism, a user name and password identification password, a pattern matching identification mechanism, a GPS identification mechanism, or an RFID mechanism.

Such identification data or credentials may be inputted through one or more of the readers 124 of the enclave device 100. Once identification data or credentials have been obtained through two of the aforementioned mechanisms, the enclave device 100 may then work with the switch 304 to authenticate the user 400A in operation 506. Operation 506 may involve the switch 304 authenticating the user 400A through the VSC opened (for example, VSC 428A). In this operation, the switch 304 may authenticate the user 400A trying to access the resource by comparing a credential or a hash of the credential (see FIG. 6) against a stored credential in the authentication database 434 of the control plane 430 of the switch 304. The stored credential may be a credential entered into the authentication database 434 by a network administrator or may be a credential stored in the authentication database 434 after a previous transaction to create, modify, or validate a user authentication data. This authentication may be done through either the in-band VSC or the out-of-band VSC opened (such as VSC 428A). In one embodiment, operation 504 may be considered a sub-operation of 506 Operation 506 may also involve additional sub-operations which are illustrated in further detail in FIG. 6. The VSC may then be immediately closed once the authentication is complete.

Once authenticated, operation 508 may involve the enclave device 100 sending a configuration data or a configuration setting through the NFC chip 120 embedded in the enclave device 100. Operation 510 may involve the switch 304 receiving a configuration data from the enclave device 100 through an NFC chip embedded in the switch 304. Operations 508 and 510 allow the user 400A to provision the switch 304 by simply holding the enclave device 100 close to the switch 304.

Operation 512 may involve the enclave device 100 generating a one-time software token (EST). At the same time that the enclave device 100 is generating the one-time EST, the switch 304 may independently generate an EST in operation 516. Operation 514 may involve the enclave device 100 sending a hash of the generated one-time EST to the switch 304 through the VSC 428A. In operation 518, programs in the control plane 430 of the switch 304 may then analyze and compare the hash of the generated one-time EST received from the enclave device 100 against the EST independently generated by the switch 304.

Operation 520 may involve the switch 304 granting the user 400A access to the resource based on a result of the comparison. Furthermore, operation 522 may involve the control plane 430 of the switch 304 accounting, in near real time, for a transaction conducted by the user 400A accessing the resource. Finally, operation 524 involves the switch 304 accepting the configuration data received through the NFC chip 120, and provisioning the switch hardware and software. Operation 526 involves the switch 304 issuing a health data through the enclave device 100 (or another processing device) or through a display interface on the switch 304.

In one or more embodiments, the user 400A may refer to a human user accessing a resource on the client device 130 through the enclave device 100. In other embodiments, the user 400A may refer to another client device used by a human user to access the client device 130. For example, the user 400A may be a human user's home computer used by the human user to access a work laptop (which may be client device 130 in this case), which may, in turn, be instructed by the home computer open an enterprise application on the work laptop to retrieve a resource behind the switch 304. The user 400A, in this case, would be the home computer rather than the human user. It may be beneficial to point out at this time that, unless otherwise indicated, all references to the client device 130 may also refer to any of the client device 407A to 407N.

Figure 6:
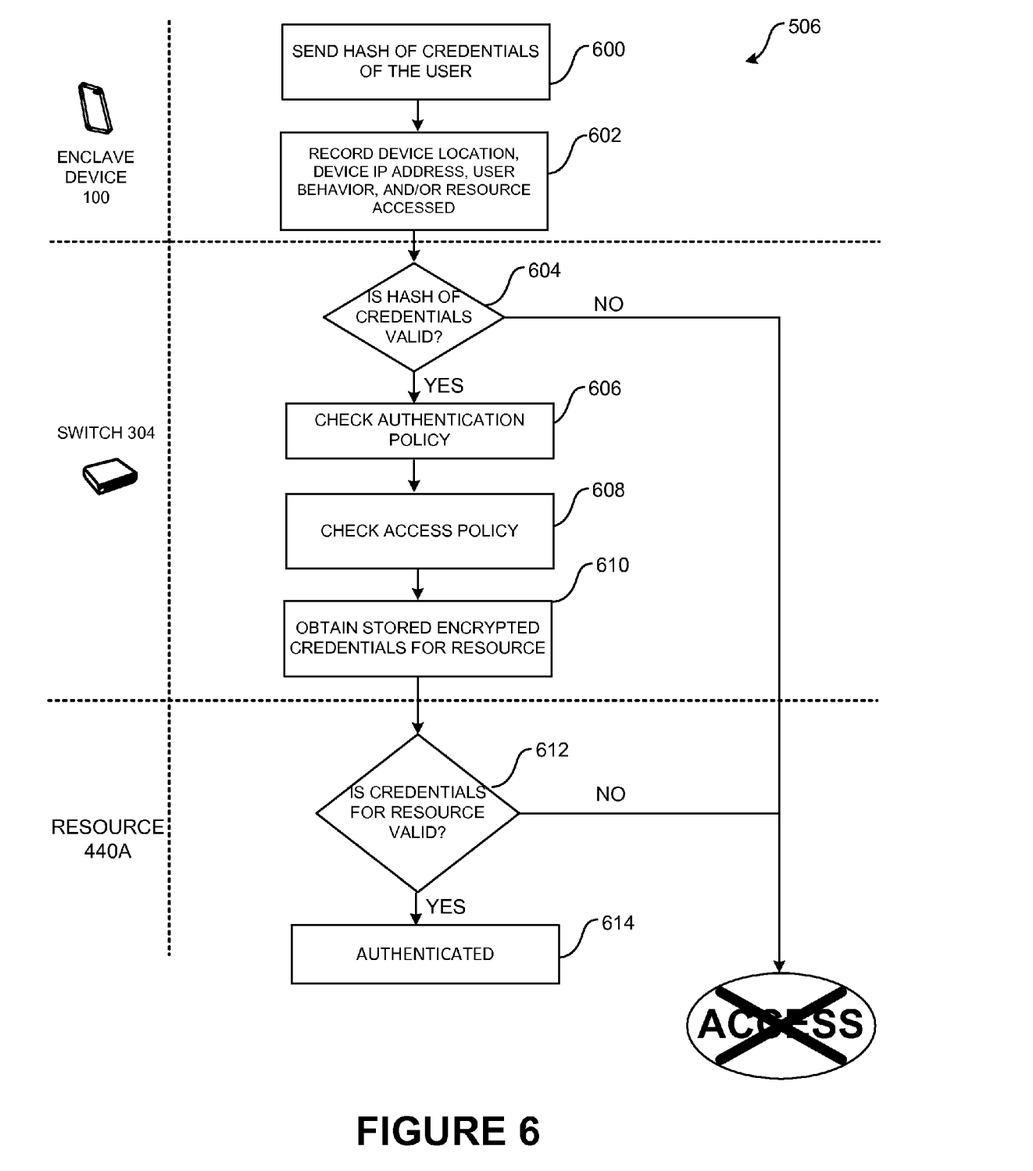
FIG. 6 illustrates a flowchart diagram of authenticating a user through the enclave device of FIG. 1 and a switch managing the SDN, according to one or more embodiments.

Reference is now made to FIG. 6, which illustrates a flowchart diagram of authenticating a user through the enclave device 100 of FIG. 1 and the switch 304, according to one or more embodiments. In particular, FIG. 6 depicts an in depth embodiment of operation 506 of FIG. 5. Operation 600 involves the enclave device 100 sending a hash of the credentials of the user 400A from the enclave device 100. In operation 602, the enclave device 100 may then record a near real-time location of the client device 130 (as provided by a GPS locator of the client device 130) and a near real-time IP address of the client device 130. Additionally, the enclave device 100 may then begin to record a user behavior of the user 400A and a list of all resources accessed by the user 400A through the enclave device 100.

In operation 604, the switch 304 may query whether the hash of the credentials received from the user 400A is valid. If the answer to this query is yes, the switch 304 may then proceed to operation 606. If the answer to the query is no, the switch 304 may then deny the user 400A access to the resource (e.g., resource 440A) by closing the VSC. In operation 606, the switch 304 may be prompted to check the authentication policy. Moreover, in operation 608, the switch 304 may be prompted to also check the access policy which may contain specific rules such as user's role, time of day, or other relevant policy data concerning the resource in question. In operation 610, the switch 304 may obtain a set of stored encrypted credentials for the resource and transmit the credentials to the resource. This comprises a legacy username and password specifically and only for that given resource, permitting the switch to provide single sign on (SSO) and a common credentialing system regardless of the number of disparate resources. Finally, in operation 612, the resource (for example resource 440A) may decide whether the credentials for the resource are valid before authenticating the user 400A. If the resource 440A determines that the credentials for the resource are not valid, the resource 440A may deny the user 400A access to the resource.

As indicated above, in one embodiment, the resource 440A may reside on an application server communicatively coupled to the switch 304 or the resource 440A may reside on the switch 304. Moreover, the resource 440A may have a presentation layer residing on the client device 130 (for example, resource 410A) coupled to the enclave device 100 used by the user 400A to access the resource behind the switch.

Figure 7:
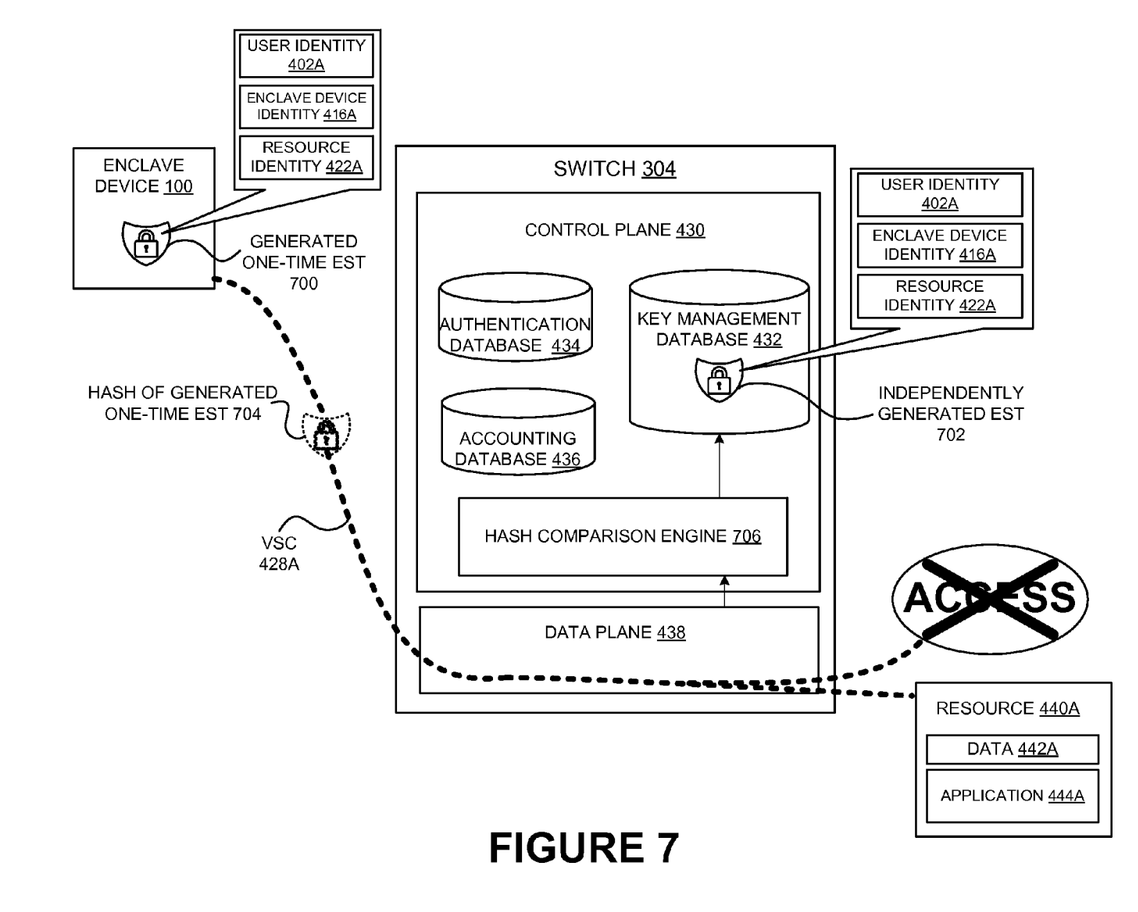
FIG. 7 illustrates the enclave device of FIG. 1 facilitating the authorization of a user, according to one or more embodiments.

Reference is now made to FIG. 7, which illustrates the enclave device 100 of FIG. 1 facilitating the authorization of an authenticated user, according to one or more embodiments. In one embodiment depicted in FIG. 7, enclave device 100 may facilitate the authorization of a user (for example, user 400A of FIG. 4) requesting access to a resource (such as resource 440A) by the switch 304. In one exemplary embodiment shown in FIG. 7, the enclave device 100 may facilitate the authorization by generating a one-time EST 700 based on a key agreement technique and using information related to the user identity 402A, the enclave device identity 416A, and/or the resource identity 422A. The enclave device 100 may then send a hash of the generated one-time EST 704 over an out-of-band VSC, depicted in FIG. 7 as VSC 428A. It should be understood by one of ordinary skill in the art of network security that the hash of the generated one-time EST 704 may be created by applying a hashing algorithm to the generated one-time EST 700 such as SHA-256 (FIPS 180-4).

Simultaneously, the control plane 430 of the switch 304 may independently generate an EST 702 based on a key agreement technique and also using information related to the user identity 402A, the enclave device identity 416A, and/or the resource identity 422A. The user identity 402A, the enclave device identity 416A, and/or the resource identity 422A may be received from the enclave device 100 when the VSC was first opened. Once the EST has been independently generated by the control plane 430 of the switch 304, the independently generated EST 702 may be stored in the key management database 432 of the control plane 430 of the switch 304. The hash of the one-time EST 704 may then be sent by the enclave device 100 to a hash comparison engine 706 on the control plane 430 of the switch 304.

The hash comparison engine 706 may analyze and compare the hash of the generated EST 704 received from the enclave device 100 against the one-time EST 702 stored in the key management database 432. The data plane 438 of the switch 304 may then grant the user (for example, the user 400A) of the client device 130 coupled to the enclave device 100 access to the resource 440A through the VSC 428A. In one embodiment, the resource 440A may comprise of an application residing on an application server communicatively coupled to the switch 304.

One a user has been authenticated and authorized according to the methods described above and the transaction conducted by the user has been accounted for in the accounting database 436, the switch 304 can ensure a non-repudiation of the transaction to a third-party.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The process flows and flow diagrams depicted in the figures do not require the particular order shown, or sequential order, to achieve desirable results. In addition, others may be provided, or steps may be eliminated from the described flows, and other components may be added to or removed from the depictions.

What is claimed is:

1. A machine-implemented method to provide an end-to-end secure transaction over a software defined network (SDN) through an enclave device capable of opening an in-band virtual secure channel (VSC) and an out-of-band VSC over the SDN, comprising:
   opening, through the enclave device, either the in-band VSC or the out-of-band VSC over the SDN;
   authenticating, through the enclave device, a user of a resource over either the in-band VSC or the out-of-band VSC;
   facilitating, through the enclave device, an authorization of the user to access the resource over either the in-band VSC or the out-of-band VSC; and
   accounting for a transaction conducted by the user accessing the resource, through the enclave device, over at least one of the in-band VSC and the out-of-band VSC, wherein:
   the in-band VSC is opened over an in-band network and the out-of-band VSC is opened over an out-of-band network,
   the in-band network is either a wireless network established over a licensed radio frequency band or a wired network, and
   the out-of-band network is a wireless network established over an unlicensed radio frequency band.

2. The method of claim 1, further comprising:
   authenticating the user of the resource through a multi-factor authentication mechanism using at least one of a plurality of readers of the enclave device, wherein the multi-factor authentication mechanism comprises at least two of a near-field communication (NFC) identification mechanism, a biometric reader identification mechanism, a user name and password identification mechanism, a pattern matching identification mechanism, a global positioning system (GPS) identification mechanism, and a radio-frequency identification (RFID) mechanism.

3. The method of claim 1, further comprising:
facilitating, through the enclave device, the authorization of the user to access the resource by:
generating a one-time encrypted software token (EST) through a trusted platform module (TPM),
sending a hash of the one-time EST through at least one of the in-band VSC and the out-of-band VSC to a switch managing the SDN, and
authorizing the user to access the resource based on a comparison of the hash of the one-time EST with a one-time EST independently generated by the switch.

4. The method of claim 1, wherein the enclave device is an integrated circuit chip embedded in a client device used by the user to access the resource.

5. The method of claim 1, wherein the enclave device is a software module running on a client device used by the user to access the resource.

6. The method of claim 1, wherein at least one of the in-band VSC and the out-of-band VSC is opened at one of a resource level, a resource flow level, and a network level and a virtual network is established over at least one of the in-band VSC and the out-of-band VSC.

7. The method of claim 1, wherein the enclave device comprises a battery, a low-power processor, an NFC chip, a plurality of readers, an interface to a client device used by the user to access the resource, and a storage device coupled to the low-power processor.

8. The method of claim 7, wherein the interface to the client device is a physical interface that couples the enclave device to the client device through a physical connection.

9. The method of claim 7, wherein the interface to the client device is a radio interface that couples the enclave device to the client device through a radio frequency connection.

10. An enclave device to provide an end-to-end secure transaction over a software defined network (SDN) and capable of opening an in-band virtual secure channel (VSC) and an out-of-band VSC over the SDN, comprising:
one or more low-power processors;
one or more storage devices communicatively coupled to the one or more low-power processors;
a plurality of readers communicatively coupled to the one or more low-power processors;
an NFC chip communicatively coupled to the one or more low-power processors;
a battery;
an interface to a client device; and
one or more programs, wherein the one or more programs are stored in the one or more storage devices and executable by the one or more low-power processors, the one or more programs comprising:
instructions to open either the in-band VSC or the out-of-band VSC from the client device to a switch managing the SDN,
instructions to authenticate a user of a resource over either the in-band VSC or the out-of-band VSC,
instructions to facilitate an authorization of the user to access the resource using the client device over either the in-band VSC or the out-of-band VSC, and
instructions to account for a transaction conducted by the user through the client device using the resource over either the in-band VSC or the out-of-band VSC, wherein:
the in-band VSC is opened over an in-band network and the out-of-band VSC is opened over an out-of-band network,
the in-band network is either a wireless network established over a licensed radio frequency band or a wired network, and
the out-of-band network is a wireless network established over an unlicensed radio frequency band.

11. The enclave device of claim 10, wherein:
at least one of the in-band VSC and the out-of-band VSC is opened at one of a resource level, a resource flow level, and a network level; and
a virtual network is established over at least one of the in-band VSC and the out-of-band VSC.

12. The enclave device of claim 10, further comprising:
instructions to authenticate the user through a multi-factor authentication mechanism using at least one of the plurality of readers of the enclave device, wherein the multi-factor authentication mechanism comprises at least two of a near-field communication (NFC) identification mechanism, a biometric reader identification mechanism, a user name and password identification mechanism, a pattern matching identification mechanism, a global positioning system (GPS) identification mechanism, and a radio-frequency identification (RFID) mechanism.

13. The enclave device of claim 10, further comprising:
instructions to facilitate the authorization of the user to access the resource using the client device with further instructions to:
generate a one-time encrypted software token (EST) through a trusted platform module (TPM),
send a hash of the one-time EST through at least one of the in-band VSC and the out-of-band VSC to the switch, and
authorize the user to access the resource based on a comparison of the hash of the one-time EST with a one-time EST independently generated by the switch.

14. The enclave device of claim 10, wherein the interface to the client device is a physical interface that couples the enclave device to the client device through a physical connection.

15. The enclave device of claim 10, wherein the interface to the client device is a radio interface that couples the enclave device to the client device through a radio frequency connection.

16. A storage medium, readable through a processor, and including instructions embodied therein and configured to be executable through the processor, comprising:
instructions to open at least one of an in-band virtual secure channel (VSC) and an out-of-band VSC from a client device to a switch managing a software defined network (SDN);
instructions to authenticate, through a reader communicatively coupled to the processor, a user of a resource over at least one of the in-band VSC and the out-of-band VSC;
instructions to facilitate an authorization of the user to access the resource over at least one of the in-band VSC and the out-of-band VSC; and
instructions to account for a transaction conducted by the user using the resource over at least one of the in-band VSC and the out-of-band VSC.

17. The storage medium of claim 16, wherein:
the in-band VSC is opened over an in-band network and the out-of-band VSC is opened over an out-of-band network;
the in-band network is at least one of a wireless network established over a licensed radio frequency band and a wired network;
the out-of-band network is a wireless network established over an unlicensed radio frequency band;
at least one of the in-band VSC and the out-of-band VSC is opened at one of a resource level, a resource flow level, and a network level; and
a virtual network is established over at least one of the in-band VSC and the out-of-band VSC.

18. The storage medium of claim 16, further comprising:
instructions to authenticate the user of the resource through a multi-factor authentication mechanism using the reader, wherein the multi-factor authentication mechanism comprises at least two of a near-field communication (NFC) identification mechanism, a biometric reader identification mechanism, a user name and password identification mechanism, a pattern matching identification mechanism, a global positioning system (GPS) identification mechanism, and a radio-frequency identification (RFID) mechanism.

19. The storage medium of claim 16, further comprising:
instructions to facilitate the authorization of the user to access the resource with further instructions to:
generate a one-time encrypted software token (EST) through a trusted platform module (TPM),
send a hash of the one-time EST through at least one of the in-band VSC and the out-of-band VSC to the switch, and
authorize the user to access the resource based on a comparison of the hash of the one-time EST with a one-time EST independently generated by the switch.

* * * * *